Patented Apr. 10, 1934

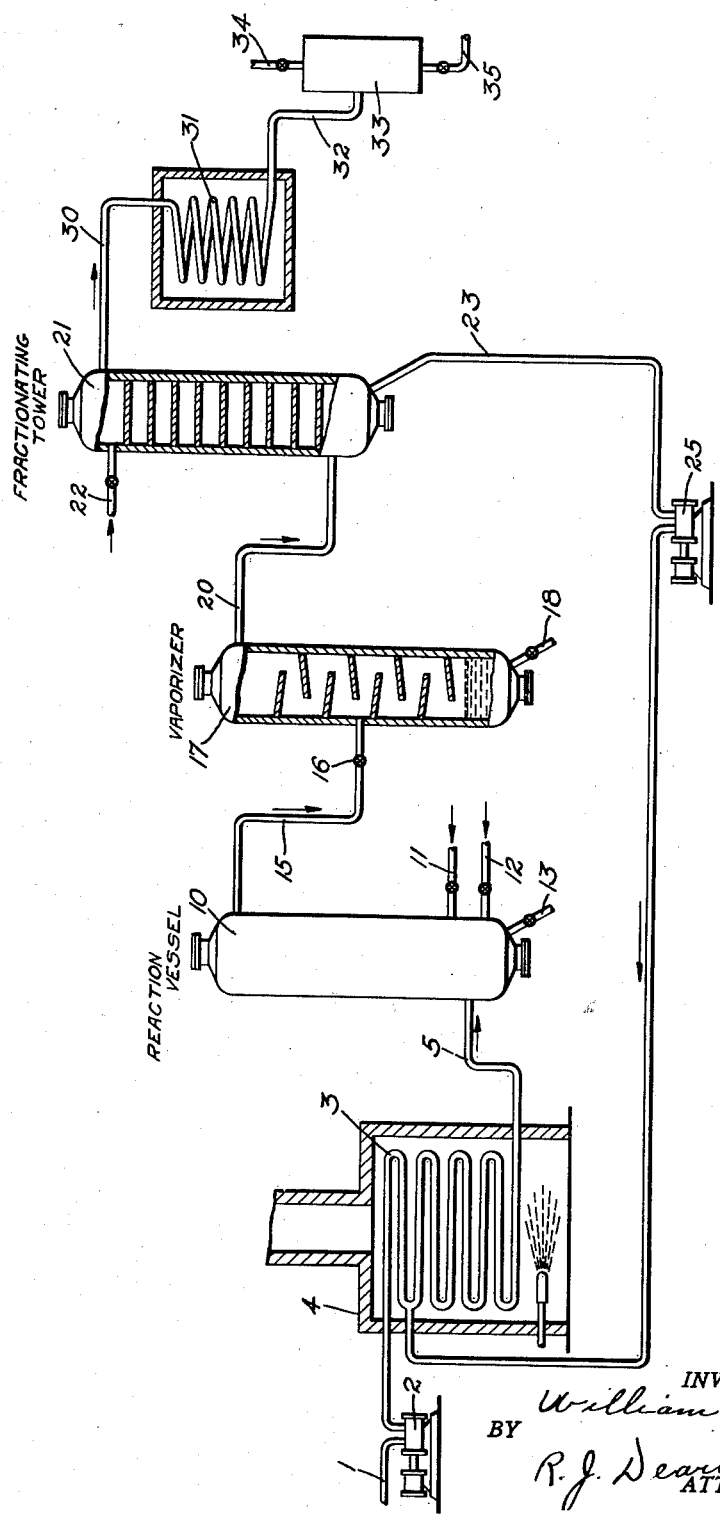

1,954,431

UNITED STATES PATENT OFFICE 1,954,431

TREATING OILS

William M. Stratford, New York, N. Y., assignor to The Texas Company, New York, N. Y., a corporation of Delaware Application December 8, 1930, Serial No. 500,724

2 Claims. (Cl. 196—53)

This invention relates to a process of converting higher boiling hydrocarbon oils to low boiling oils, and has to do particularly with the treating of hydrocarbon oils at high temperature and under high pressure to convert and hydrogenate the oil into low boiling products, such as gasoline, having high anti-knock value.

The conversion of high boiling oils by heat treatment in the presence of aluminum chloride is well known. Anhydrous aluminum chloride, when heated with hydrocarbon oils, causes an energetic reaction, presumably catalytic in nature, which rearranges the hydrocarbons chemically; that is, redistributes the hydrogen and carbon in new combinations. Light oils are formed which are relatively rich in hydrogen and heavy semi-solid products are produced which are poor in hydrogen and rich in carbon. The reaction, therefore, under the influence of aluminum chloride, is in the nature of cracking or conversion of heavy oils into light products and at the same time a migration of the hydrogen from the heavy residue to the lighter products, or, in other words, a hydrogenation of the low boiling hydrocarbons at the expense of the high boiling asphaltic materials. The reaction has furthermore been known to produce an equilibrium condition which may be unbalanced by the addition from an extraneous source of one of the reacting components, for example hydrogen, a gas comprising hydrogen, or an oil rich in hydrogen.

The addition of hydrogen from an extraneous source to oils undergoing conversion in the presence of aluminum chloride, is also old in the art and no claim is made, broadly, to such a process; however, as far as I am aware, the process of treating oils in the presence of aluminum chloride, and a gas comprising hydrogen under extremely high temperature and pressure conditions to effect conversion and hydrogenation of the oils and to produce low boiling oils of high anti-knock value, is new in the art. In the application for U. S. patent by Otto Behimer, Ser. No. 16,306, filed March 18, 1925, issued as Patent No. 1,835,748 a process is described in which oil is heated in the presence of aluminum chloride and a gas comprising hydrogen at temperatures of about 500° F. to 700° F. and under pressures ranging from 800 to 2,000 lbs. per sq. in. The present invention is an improvement over the process disclosed in the above application and involves an improved process in which the optimum conditions for conversion and hydrogenation of oils in the presence of aluminum chloride and a gas comprising hydrogen are fully realized.

The invention contemplates the treatment of oils under high temperatures and pressures which are most suitable for the production of low boiling products of high anti-knock value. This is obtained by hydrogenation in the presence of aluminum chloride catalyst to product aromatic, naphthenic and certain aliphatic saturated derivatives which exhibit a positive anti-knock property when used as a fuel in internal combustion engines. Temperatures in excess of 900° F. are preferable, and best results have been obtained in a range of 900° F. to 1050° F., although temperatures up to 1200° F. are considered within the scope of the invention. High pressures are conducive to hydrogenation and accordingly pressures in excess of 1000 lbs. per sq. in., or sufficient to prevent vaporization, are preferred. Satisfactory results are obtained at pressures of about 3000 lbs. and even pressures upwards of 4000 lbs. may be useful with certain types of oils. The scope of the invention will be further understood as the process and apparatus are described.

The accompanying drawing shows a diagrammatic elevation with parts in section of an apparatus constructed in accordance with the invention and constituting an embodiment thereof. Referring to the drawing, the oil is drawn from a suitable source through a charging line 1 and forced by pump 2 to a heating coil 3, the latter located within a furnace 4. An outlet pipe 5 connects the heating coil with an enlarged expansion or reaction vessel 10. The reaction vessel or chamber 10 is preferably vertical, but other well known or preferred types may be used. The chamber may be supplied with a source of heat or may be heavily insulated to conserve the heat supplied thereto by the preheated oil. Hydrogen is supplied to the chamber through the pipe 11, and aluminum chloride preferably as the liquid hydrocarbon compound through the connection 12. The positions of the pipes 11 and 12 relative to each other and the location of the connections with respect to the chamber 10, are merely illustrative and may be arranged in other preferred positions. A draw-off line 13 is shown connected to the bottom of the chamber to remove heavy liquids or residue, if desired.

The reaction products from the vessel 10 are conducted from the upper part thereof through the pipe 15 in which is interposed a valve 16. By regulation of the valve 16, the pressure on the products may be reduced or otherwise regulated as they are discharged into the vaporizer 17. In the vaporizer the lower boiling products are vaporized and partially fractionated, the unvaporized liquid being drawn off through the pipe 18 at the bottom. The vapors are conducted through the pipe 20 to a fractionating tower 21. A reflux medium may be introduced through the pipe 22 located near the top of the tower. The unvaporized oils, consisting chiefly of reflux condensate, collect in the bottom of the tower and are withdrawn therefrom through the pipe 23. Pump 25 is interposed in the line 23 to force the oil therein to the heating coil 3 where it enters preferably at one or more points along the coil. The vapors from the fractionating tower 21, consisting of products boiling substantially within the boiling range of gasoline, escape from the top of the tower and are conducted by the pipe 30 to the condenser coil 31. The condensates drain through the pipe 32 to the receiver 33, which is equipped with the usual vapor release pipe 34 and liquid drawoff pipe 35.

In practicing the invention with the apparatus thus illustrated, a suitable hydrocarbon, which may be, for example, a distillate oil such as gas oil, or a petroleum residue, is drawn from a suitable source of supply by the pump 2 through the line 1 and charged to the heating coil 3. The pressure employed is preferably a high pressure, such, for example, as the order of 3000 to 4000 lbs. per sq. in. If desired, the oil may be heated in the coil 3 to a cracking temperature, that is, to a temperature adapted for a commercial rate of cracking, which may generally be said to be in excess of 700° F. It is desirable to heat the oil in the coil 3 to such an extent that the hydrocarbon will be in a state of incipient cracking. In case the oil is heated to a high temperature such as to produce effective cracking, it is best to apply the heat so that the oil will not obtain this temperature until about the end of the coil and regulate the speed of flow of the oil so that no appreciable cracking takes place in the coil since it is desired to avoid having any cracking except in the presence of hydrogen. The heated oil which may be below cracking temperature, or even if preferred, in considerable excess of cracking temperature, is delivered to the reaction vessel 10.

Hydrogen, or a gas rich in hydrogen, under pressure, is admitted to the reaction chamber through the pipe 11 and is preferably brought in contact with the liquid hydrocarbon by bubbling through the mixture or other mixing means in order to secure intimate contact. The aluminum chloride may be added to the oil through the pipe 12, in the form of a solid, but I prefer to introduce the chloride into the reaction vessel in the form of a liquid hydrocarbon compound, resulting from the contact of the aluminum chloride vapors with the oil, as the liquid may be easily handled and its flow accurately regulated by mechanical means. The quantity of aluminum chloride required, will necessarily vary with the type of oil and the degree of conversion desired; however, it may be stated that a quantity ranging from 5% to 15%, by weight, of the total oil treated will in most instances meet the needs of the ordinary commercial plant.

The reaction vessel 10 is arranged to be supplied with heat which may be accurately regulated. The vessel is preferably heated to a higher temperature than that obtaining in the heating coil 3. This temperature is preferably in excess of 900° F., ranging between 900° F. and 1050° F. The oil, aluminum chloride and hydrogen are maintained in the reaction vessel for sufficient time to produce the desired degree of conversion. At the temperature and pressure obtaining in the reaction vessel, extensive conversion and hydrogenation of the oil usually occurs in a relatively short time. Tarry oils or residue accumulating in the bottom of the reaction vessel may be drawn off through the line 13, while the lighter reaction products are passed through the line 15 to the vaporizer 17. When the reaction vessel 10 is maintained under several thousand pounds pressure, it is preferable to reduce the pressure on the oil as it is discharged to the vaporizer. Reduction in pressure may be conveniently accomplished by regulation of the valve 16.

The expansion of reaction products in the vaporizer 17, either by a sudden reduction in pressure at the valve 16 or by the increased capacity of the vaporizer, causes a vaporization of the low boiling products. The vaporizer is arranged to produce a certain amount of fractionation and the heavy residues are collected in the bottom of the vaporizer and may be withdrawn continuously or intermittently through the pipe 18. The vapors from the vaporizer are then conducted by the pipe 20 into the fractionating tower 21. The fractionation may be conducted at atmospheric pressure or thereabouts, although it is often preferable to maintain a certain degree of superatmospheric pressure on the tower and through the condenser 31 in order to obtain the advantages of condensing under pressure. It will be observed that any degree of pressure in excess of atmospheric may be maintained by appropriate regulation of the expansion valve 16 and the valve in the vapor release pipe 34. Products that are heavier than the desired light distillate are drawn off from the bottom of the tower through the line 23. These products consist chiefly of high boiling reflux condensates, separated in the fractionating tower, although various amounts of a reflux medium comprising a light oil, introduced through the line 22 to control the end point, or, if desired, charging stock, may make up a considerable portion of the products passing through the line 23. The pump 25 interposed in the line 23 boosts the pressure in excess of that maintained in the heating coil so that these products may be conveniently forced into the heating coil 3, at one or more points, if desired.

In one method of practicing the invention, the receiver 33 is maintained under considerable pressure in order to facilitate the return to the hydrogenating zone of hydrogen recovered in the gases entering through the line 11. The higher the pressure maintained in the receiver 33, the less energy is required to return the hydrogen to the cracking zone for reuse. It is to be understood that any suitable means may be placed in the line 34 in order to separate or concentrate the hydrogen in the exit gases prior to the return of the hydrogen to the reaction zone.

In one method of operation contemplated, the oil is heated in coil 3 to a cracking temperature, or a temperature approaching a cracking temperature, and then raised to a cracking temperature in the reaction vessel 10 in the presence of hydrogen and aluminum chloride. In another method of operation the oil may be heated to a temperature in excess of cracking; that is, the temperature desired to be maintained in the reaction vessel 10. In the latter case, the oil is passed rapidly through the coil 3 in order to avoid deposition of carbon and substantially all the heat is supplied to the oil as it passes through the coil 3 so that little or no heat is supplied after the oil reaches the reaction chamber.

Obviously many modifications and variations of the invention, as hereinbefore set forth, may be made without departing from the spirit and scope thereof, and therefore only such limitations should be imposed as are indicated in the appended claims.

I claim:

1. The method of hydrogenation and conversion of distillate hydrocarbon oil whereby lower boiling oils such as gasoline having a high anti-knock value are produced, which comprises heating the oil to a temperature within the range of 900° to 1200° F., subjecting the oil while maintained within said temperature range and under a pressure of the order of 3000 to 4000 pounds per square inch to the action of a gas comprising hydrogen and an aluminum chloride-hydrocarbon compound catalyst for a period of time sufficient to effect the desired degree of conversion and hydrogenation and the desired anti-knock properties in the converted oil, and separating the resultant lower boiling oil from the higher boiling products of the reaction and the spent catalyst by distillation.

2. The method of hydrogenation and conversion of distillate hydrocarbon oil whereby lower boiling oils such as gasoline having a high anti-knock value are produced, which comprises heating the oil to a temperature within the range of 900° to 1200° F., subjecting the oil while maintained within said temperature range and under a pressure of the order of 3000 to 4000 pounds per square inch to the action of a gas comprising hydrogen and an aluminum chloride-hydrocarbon compound catalyst for a period of time sufficient to effect the desired degree of conversion and hydrogenation and the desired anti-knock properties in the converted oil, separating the resultant lower boiling oil from the higher boiling products of the reaction and the spent catalyst by distillation, fractionating said resultant lower boiling oil to produce a gasoline fraction of high anti-knock value and a less volatile reflux condensate, and returning the reflux condensate to the reaction zone for further conversion.

W. M. STRATFORD.